United States Patent [19]

Kuhnert

[11] 4,041,588

[45] Aug. 16, 1977

[54] MACHINE TOOL PROVIDED WITH A TOOL MAGAZINE

[75] Inventor: Hans Kuhnert, Munich, Germany

[73] Assignee: Friedrich Deckel Aktiengesellschaft, Munich, Germany

[21] Appl. No.: 594,054

[22] Filed: July 8, 1975

[30] Foreign Application Priority Data

July 11, 1974 Germany .............................. 2433435

[51] Int. Cl.² ............................................ B23B 39/18
[52] U.S. Cl. ....................................... 29/26 R; 29/55; 408/35
[58] Field of Search ................... 29/26, 51, 52, 53, 54, 29/55, 565, 568; 408/35, 31, 44; 90/11 A; 82/25

[56] References Cited

U.S. PATENT DOCUMENTS

| | | |
|---|---|---|
| 3,263,300 | 8/1966 | Schatzman ............................ 29/26 |
| 3,266,141 | 8/1966 | Jacobson et al. ...................... 29/568 |
| 3,449,822 | 6/1969 | Laumann et al. ....................... 29/568 |
| 3,780,423 | 12/1973 | Lilienthal ............................... 29/568 |
| 3,786,539 | 1/1974 | Foll et al. ................................. 29/27 |
| Re. 25,670 | 10/1964 | Hansen et al. ...................... 408/35 X |

*Primary Examiner*—Francis S. Husar
*Assistant Examiner*—William R. Briggs
*Attorney, Agent, or Firm*—Blanchard, Flynn, Thiel, Boutell & Tanis

[57] ABSTRACT

A machine tool having a tool magazine containing a plurality of tools which can be conveyed into a working or reference position by movement of the tool magazine. The tools are disposed in the magazine in the form of a matrix having rows and columns. The tool magazine is traversed in the direction of the columns and rows into a number of positions corresponding to the number of columns and rows to facilitate a movement of each tool into a position of use.

5 Claims, 2 Drawing Figures

MACHINE TOOL PROVIDED WITH A TOOL MAGAZINE

FIELD OF THE INVENTION

The invention relates to a machine tool provided with a tool magazine containing a plurality of tools which can be conveyed into a working or reference position by movement of the tool magazine.

BACKGROUND OF THE INVENTION

In such machine tools, the tools remain in the same magazine both during storage and during use so that tool-changing equipment is not therefor needed.

A machine tool of the above-specified kind has already been described in which the tool magazine is a drum (German published Patent Specn No. 1,302,431). The tool is conveyed from its storage position into a working position by rotation of the drum. For this purpose the magazine itself must be indexed into a number of working positions which correspond to the number of tools in the magazine and this necessitates the provision of a relatively complicated selective indexing and control system.

It is an object of the present invention to provide a machine tool of the above-specified kind which comprises a simple and rapidly working system of control for conveying the tools into working as reference position.

According to the invention, this is achieved by disposing the tools in the magazine as in a matrix in a system of columns and rows and by adapting the magazine to be traversed in the direction of the columns and rows into a number of positions corresponding to the number of columns and rows. The tool spindles may be horizontal or vertical or they may be mounted in any desired intermediate position.

If there are $n$ rows and $m$ columns, the magazine must be capable of being stepped $n - 1$ times in the direction of the rows and $m - 1$ times in the direction of the columns to enable any one of the tools to be conveyed into a predetermined working or reference position. In other words, assuming that nine tools are disposed in three rows and three columns, then only two steps of the magazine each in the direction of the rows and of the columns will be sufficient to move any one of the nine tools into working position. In the case of 16 tools, three steps will be sufficient, in the case of 25 tools, four steps in the direction each of the rows and columns.

According to another feature of the invention, the tool magazine may be adapted, apart from performing the traversing steps in the rows and columns, to feed in the axial direction of the tool spindle, and the relatively perpendicular feeding or adjusting movements may be performed by the work table.

According to yet another feature of the invention, means are provided enabling the tools in working position to be advanced axially into an active position from an inactive position in which they are retracted well into the magazine. The tool in active working position will thus be well clear of the other tools in the magazine.

In one embodiment of the invention the tool traversing movements of the tool magazine are imparted thereto by hydraulic stepping pistons or like means.

BRIEF DESCRIPTION OF THE DRAWING

An embodiment of the invention will now be more particularly and illustratively described with reference to the drawing in which.

DETAILED DESCRIPTION

Figure 1:
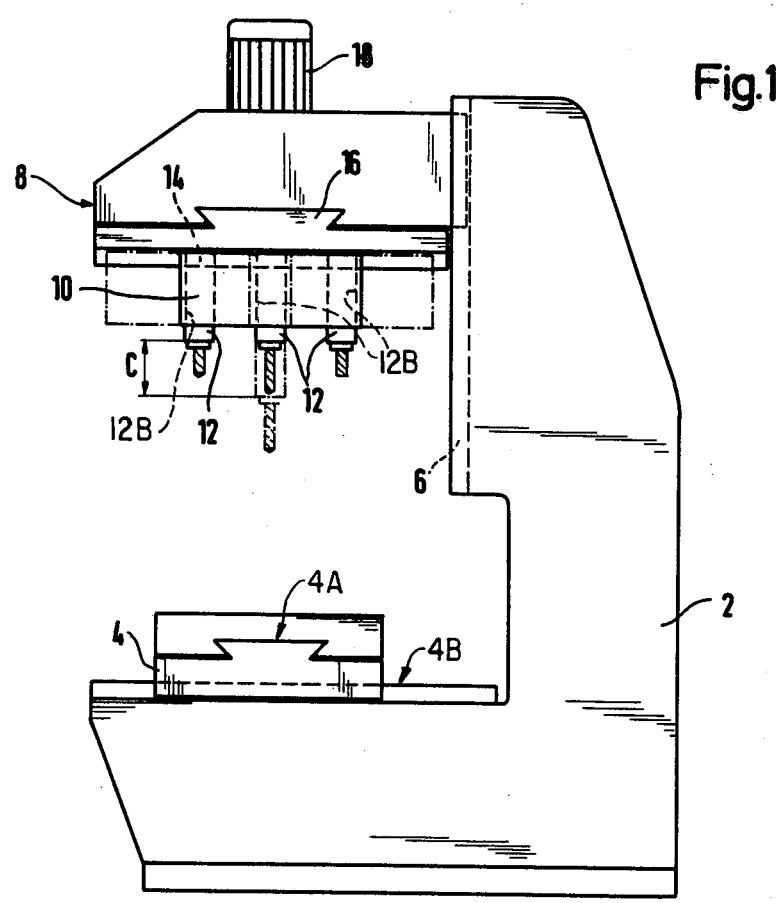
FIG. 1 is a side elevation of a multi-spindle vertical drilling machine.

Referring to the drawing, there is provided a machine tool having a tool magazine for nine tools held in nine vertical tool spindles. As already explained above, the tool magazine may be located in any other desired position in space. Moreover, instead of nine tools, it might contain for instance 16, 25 or more tools.

The drilling machine in FIG. 1 comprises a column 2 which carries a horizontal compound work table 4 and a drilling head 8 mounted in vertical ways 6 and carrying a magazine 10 containing the tools 12 of which only the row nearest the viewer is seen in the drawing.

The tool magazine 10 can be traversed in two horizontal coordinate directions in mutually perpendicular horizontal ways 14 and 16 as will be later described in greater detail. Moreover, the drilling head can be bodily moved in the vertical ways 6 on the column 2 to provide the tool feed. Means are also provided for coupling the vertical feed motion with the rotary motion of the tool, for example for the purpose of thread cutting.

The drilling head 8 has a motor 18 mounted thereon which serves to drive the tool spindles and — at least in thread cutting — for vertically feeding the entire drilling head.

It will also be understood from FIG. 1 that in the working or reference position, each tool, respectively each tool spindle can be advanced in guides 12B axially a distance marked $c$ from a position in which it is retracted far back into the tool magazine 10. This brings the working tool into a position in which it is well clear of the other tools in the magazine.

The compound table 4 serves for supporting the workpiece. The table 4 and column 2 include ways 4A and 4B which are mutually perpendicular. The workpiece is set up in relation to the drilling tool by traversing the work table.

Figure 2:
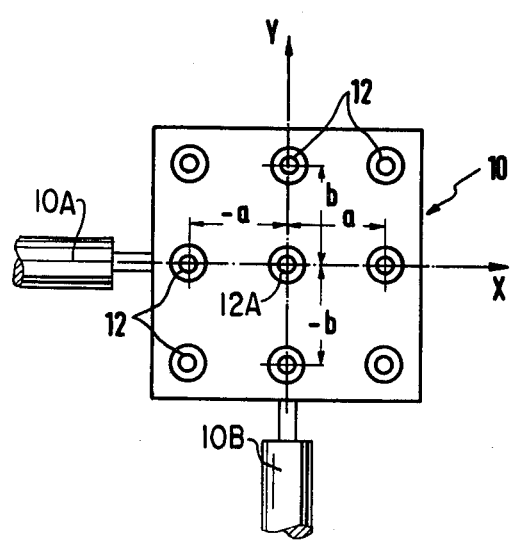
FIG. 2 is a schematic representation of a tool magazine containing nine tools.

FIG. 2 is a schematic representation of the disposition of nine tools in three rows and three columns in the magazine. Starting from what may be considered the normal magazine reference position in which the axis of the tool in the center of the magazine 10 is in the working or reference position (origin of an $x$-$y$ coordinate system), any one of the other tools can be moved parallel to the mutually perpendicular ways 14 and 16 into the working or reference position by stepping the magazine not more than once in the direction of the negative or positive $x$- or $y$-axis. Altogether, only two steps in the direction of the rows and two steps in the direction of the columns are needed. For instance, in order to move the tool in the left hand bottom corner into the working position, i.e. into the position previously occupied by the tool in the center, the tool magazine 10 must be traversed a distance $a$ to the right and a distance $b$ upwards.

As a drive means for traversing the magazine in the two coordinate directions, stepping cylinders 10A and 10B schematically illustrated in FIG. 2 each provide two steps or the like may be used.

In the same way, 25 tools could be disposed in five rows and five columns, in which case two stepping drives each providing four steps would be needed for traversing the magazine, as will be readily understood without the need of a special illustration.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A machine tool, comprising:
   a base having a support member and a work supporting surface thereon, said work supporting surface having first guide means guiding a movement of said work supporting surface relative to said support member;
   tool magazine means mounted on said support member and having a plurality of tools thereon having parallel axes and oriented in rows and columns, said tool magazine having a surface from which said plurality of tools project spaced from said work supporting surface;
   second guide means on said support member and said tool magazine guiding said tool magazine means for movement relative to said work supporting surface in a direction parallel to said rows;
   third guide means on said support member and said tool magazine guiding said tool magazine means for movement relative to said work supportiing surface in a direction parallel to said columns; a tool driving means operative to drive a tool in registry therewith, said tool driving means being aligned at a single reference position on said tool machine defining a reference axis which is parallel to the axes of said tools and intersects said support member at the junction of one selected row and one selected column, said reference axis remaining in a fixed location during movement of said work supporting surface on said first guide means and during movement of said tool magazine means on said second guide means; and
   drive means operative to effect a stepwise traverse of said tools in said tool magazine in directions parallel to said rows and columns to facilitate a location of the axes of individual ones of different tools at said single reference position coaxial with said reference axis.

2. A machine tool according to claim 1, wherein said tools are disposed in relatively orthogonal columns and rows.

3. A machine tool according to claim 1, wherein said support member includes fourth guide means supporting said tool magazine means for movement in a direction parallel to said reference axis at said reference position and wherein said first guide means supports said work surface for movements perpendicular to said reference axis at said reference position.

4. A machine tool according to claim 1, wherein said tool magazine means includes additional guides guiding each of said tools for movement parallel to said reference axis at said reference position into an active working position from an inactive working position in which said tools are well retraced into said tool magazine means.

5. A machine tool according to claim 1, wherein said tool magazine means carries said tool in three rows and three columns.

* * * * *